US011305227B2

(12) United States Patent
Ball et al.

(10) Patent No.: US 11,305,227 B2
(45) Date of Patent: Apr. 19, 2022

(54) HEATED MOISTURE PUMP HAVING A DIFFERENTIAL VALVE AREA

(71) Applicant: W. L. Gore & Associates, Inc., Newark, DE (US)

(72) Inventors: Earl Ball, Middletown, DE (US); Michael Keough, Newark, DE (US); David T DeGuiseppi, Chadds Ford, PA (US)

(73) Assignee: W. L. Gore & Associates, Inc., Newark, DE (US)

(*) Notice: Subject to any disclaimer, the term of this patent is extended or adjusted under 35 U.S.C. 154(b) by 327 days.

(21) Appl. No.: 16/336,252

(22) PCT Filed: Oct. 6, 2017

(86) PCT No.: PCT/US2017/055560
§ 371 (c)(1),
(2) Date: Mar. 25, 2019

(87) PCT Pub. No.: WO2018/067944
PCT Pub. Date: Apr. 12, 2018

(65) Prior Publication Data
US 2019/0255482 A1   Aug. 22, 2019

Related U.S. Application Data

(60) Provisional application No. 62/405,475, filed on Oct. 7, 2016.

(51) Int. Cl.
*B01D 53/04*   (2006.01)
*B01D 53/26*   (2006.01)
(Continued)

(52) U.S. Cl.
CPC ..... *B01D 53/0446* (2013.01); *B01D 53/0438* (2013.01); *B01D 53/261* (2013.01);
(Continued)

(58) Field of Classification Search
CPC .............. B01D 53/04; B01D 53/0438; B01D 53/0446; B01D 53/261; B01D 53/28;
(Continued)

(56) References Cited

U.S. PATENT DOCUMENTS

| 4,809,144 A * | 2/1989 | Suzuki .................. F21S 45/33 |
| | | 362/547 |
| 4,985,296 A * | 1/1991 | Mortimer, Jr. .......... B29C 55/18 |
| | | 428/220 |

(Continued)

FOREIGN PATENT DOCUMENTS

| EP | 1 818 609 A2 | 8/2007 |
| JP | 2001-259353 A | 9/2001 |

(Continued)

OTHER PUBLICATIONS

International Search Report and Written Opinion issued in International Application No. PCT/US2017/055560 dated Feb. 27, 2018.

*Primary Examiner* — Frank M Lawrence, Jr.

(57) ABSTRACT

Systems including a moisture pump for removing moisture from an inside environment to an outside environment. The moisture pump includes a housing defining a chamber with a heater, a heat spreader, and a desiccant for selectively adsorbing water vapor in the heating chamber when the heater is off and desorbing water vapor into the heating chamber when the heater is on. A valve assembly is also maintained by the housing transitionable between an adsorption position and desorption position. The adsorption position allows water vapor to be selectively transmitted into the heating chamber from the inside environment. The desorption position allows water vapor to be transmitted from the heating chamber for transmission into the outside environment. The adsorption and desorption ports can have asymmetric adsorption and desorption areas.

19 Claims, 12 Drawing Sheets

(51) Int. Cl.
  *B01D 53/28* (2006.01)
  *F21S 45/33* (2018.01)
(52) U.S. Cl.
  CPC .............. *B01D 53/28* (2013.01); *F21S 45/33* (2018.01); *B01D 2253/106* (2013.01); *B01D 2253/1124* (2013.01); *B01D 2253/202* (2013.01); *B01D 2253/25* (2013.01); *B01D 2253/34* (2013.01); *B01D 2257/80* (2013.01); *B01D 2259/40003* (2013.01); *B01D 2259/40096* (2013.01); *B01D 2259/4525* (2013.01); *B01D 2259/4566* (2013.01)
(58) Field of Classification Search
  CPC ...... B01D 2253/106; B01D 2253/1124; B01D 2253/202; B01D 2253/25; B01D 2253/34; B01D 2257/80; B01D 2259/40003; B01D 2259/40096; B01D 2259/4525; B01D 2259/4566; F21S 45/33
  USPC ............ 96/146, 147, 148; 55/385.6; 34/472, 34/473, 80
  See application file for complete search history.

(56) References Cited

U.S. PATENT DOCUMENTS

| 5,669,123 | A | 9/1997 | Anderson | |
|---|---|---|---|---|
| 6,210,014 | B1* | 4/2001 | Kubizne | F21S 45/37 |
| | | | | 362/96 |
| 6,709,493 | B2* | 3/2004 | DeGuiseppi | B01D 53/261 |
| | | | | 96/7 |
| 7,217,314 | B2* | 5/2007 | DeGuiseppi | B01D 53/261 |
| | | | | 362/294 |
| 2005/0157514 | A1* | 7/2005 | Brinkmann | B60Q 1/0005 |
| | | | | 362/547 |
| 2016/0363331 | A1* | 12/2016 | Keough | B01D 53/265 |

FOREIGN PATENT DOCUMENTS

| JP | 2013-158668 A | 8/2013 |
|---|---|---|
| WO | 2016/201045 A1 | 12/2016 |

* cited by examiner

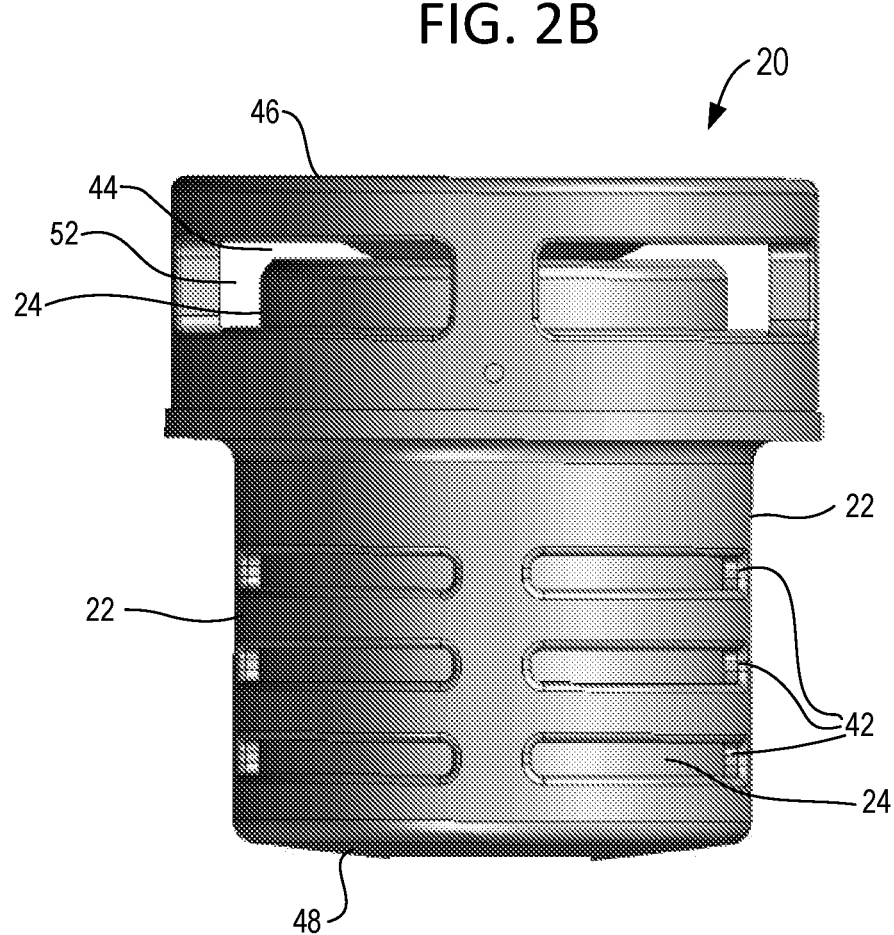

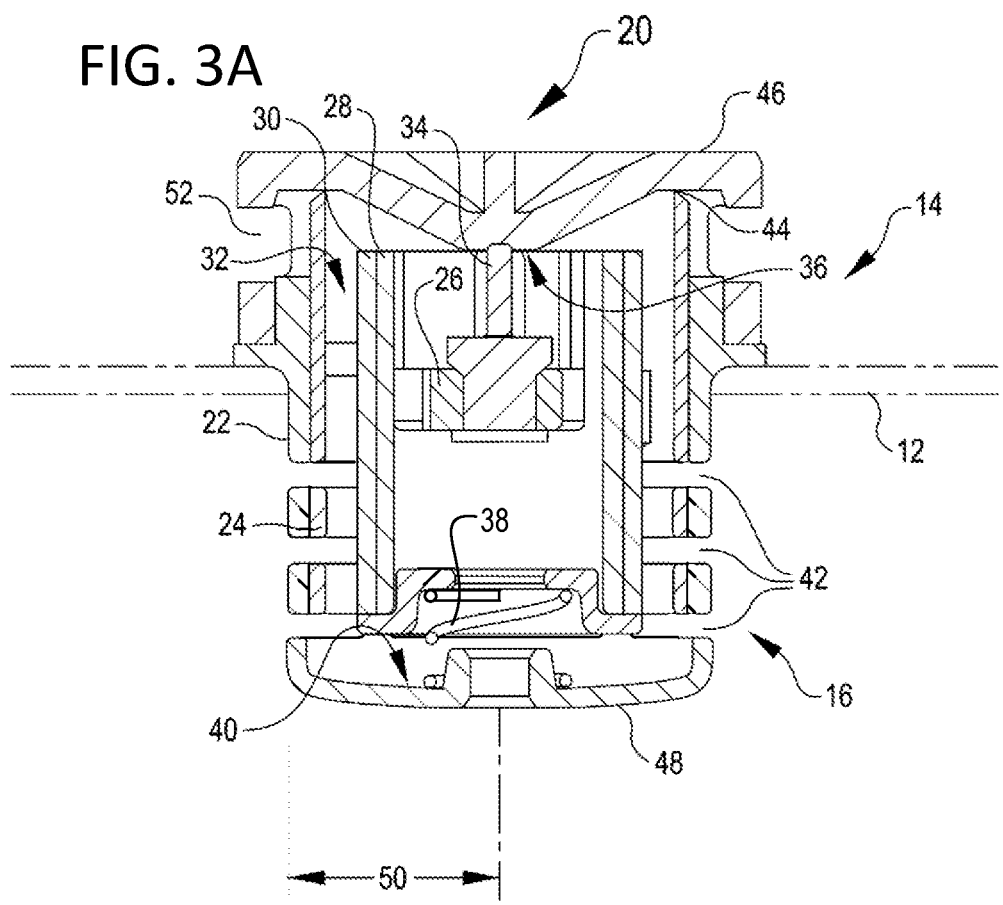

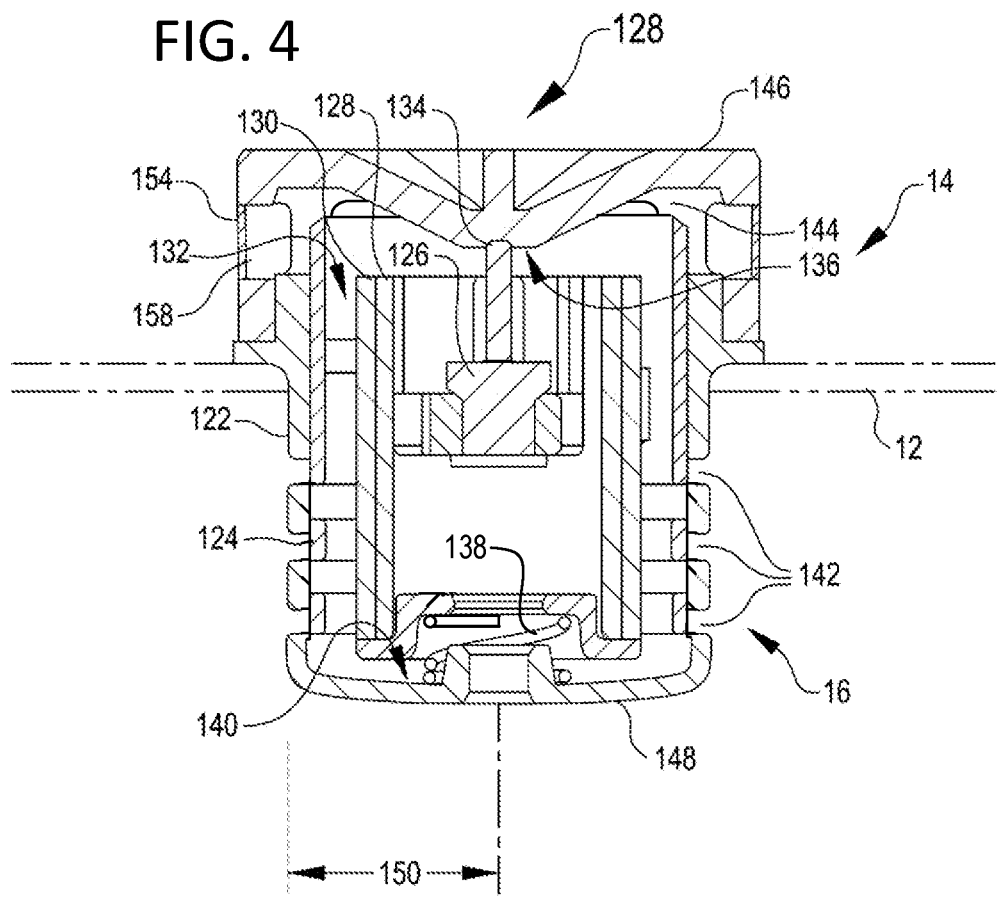

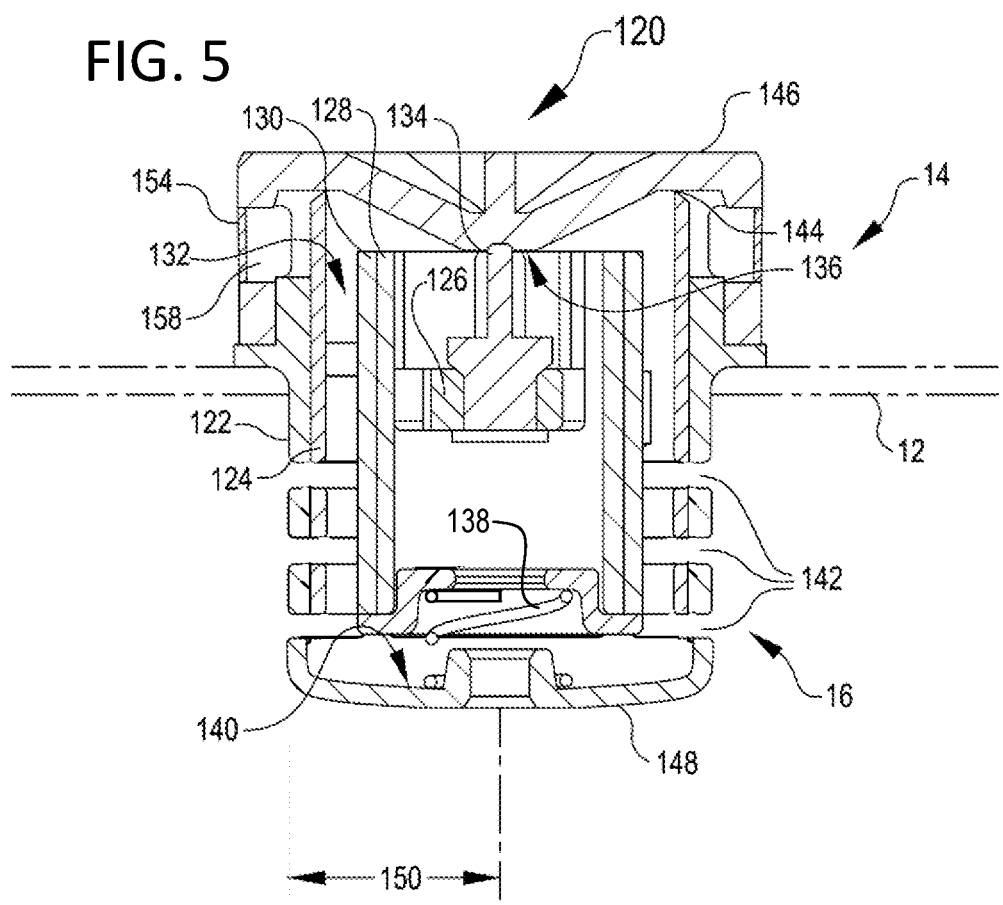

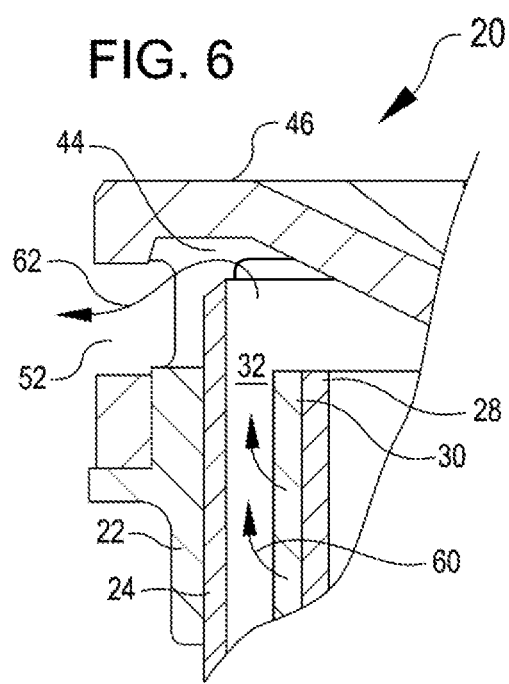

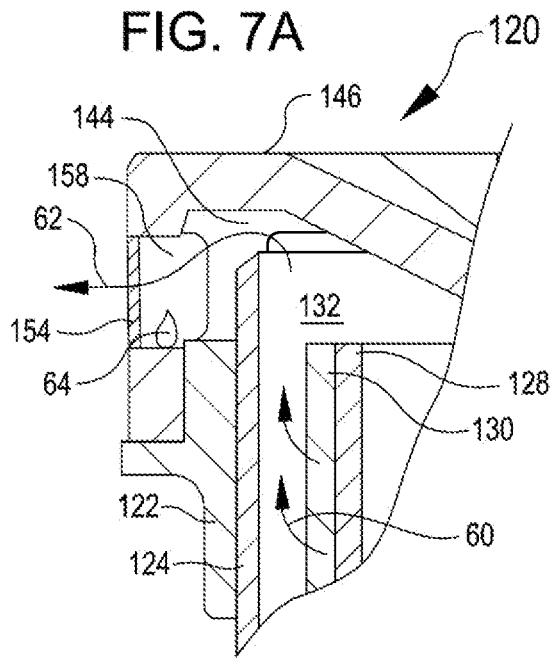
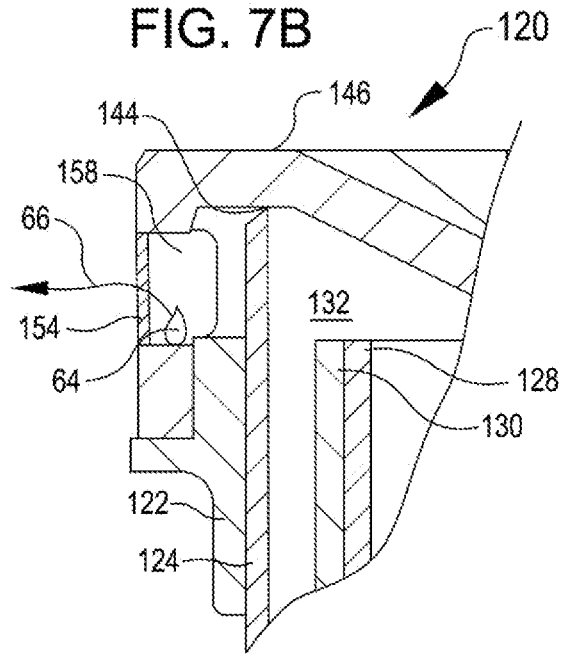

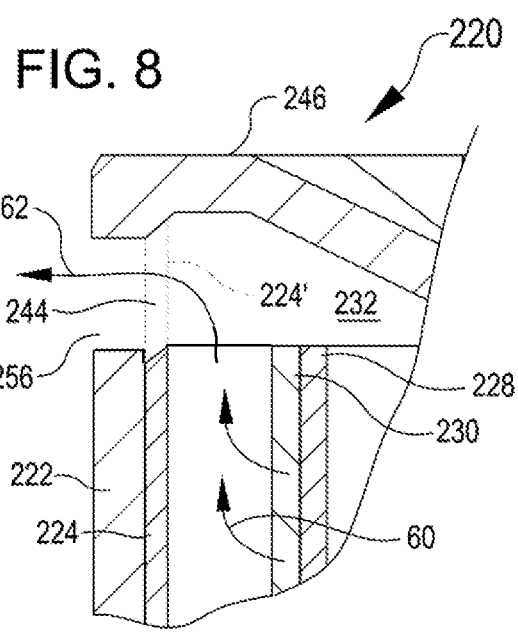

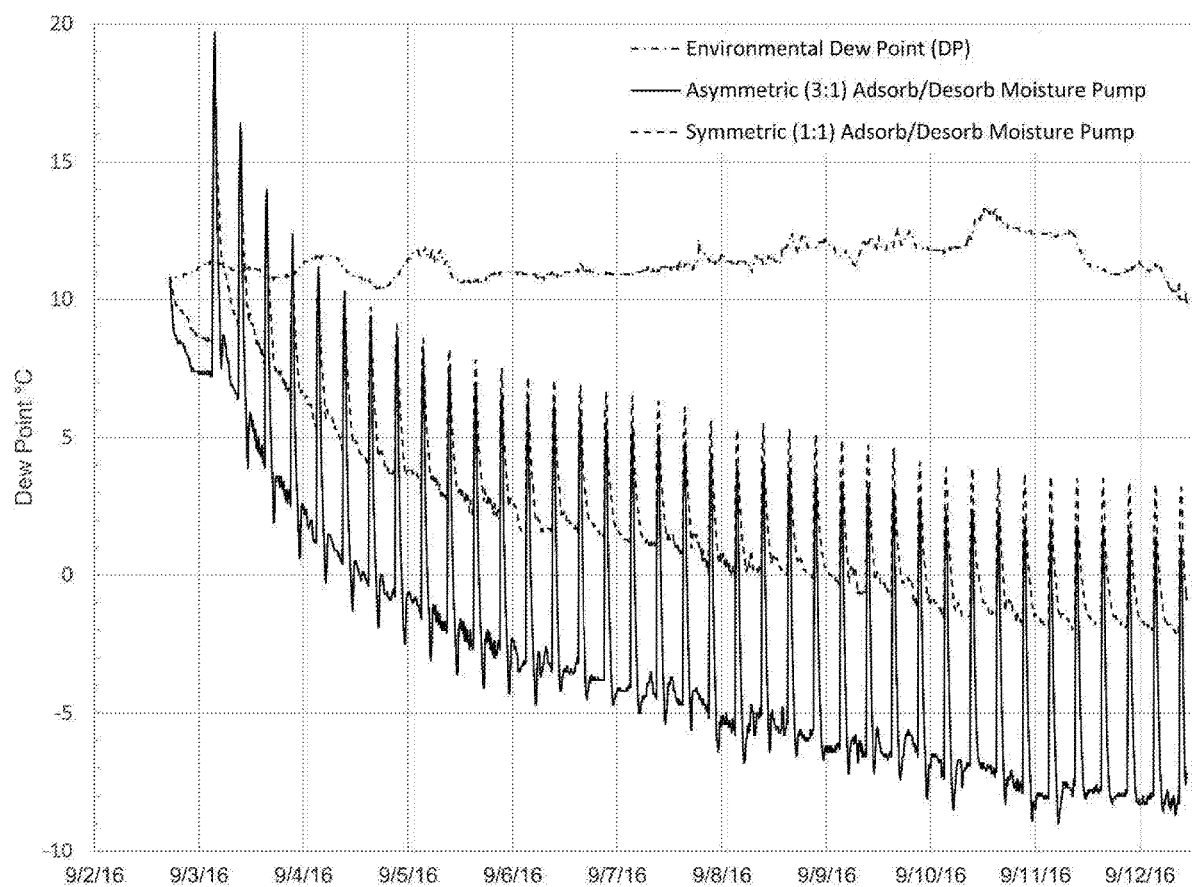

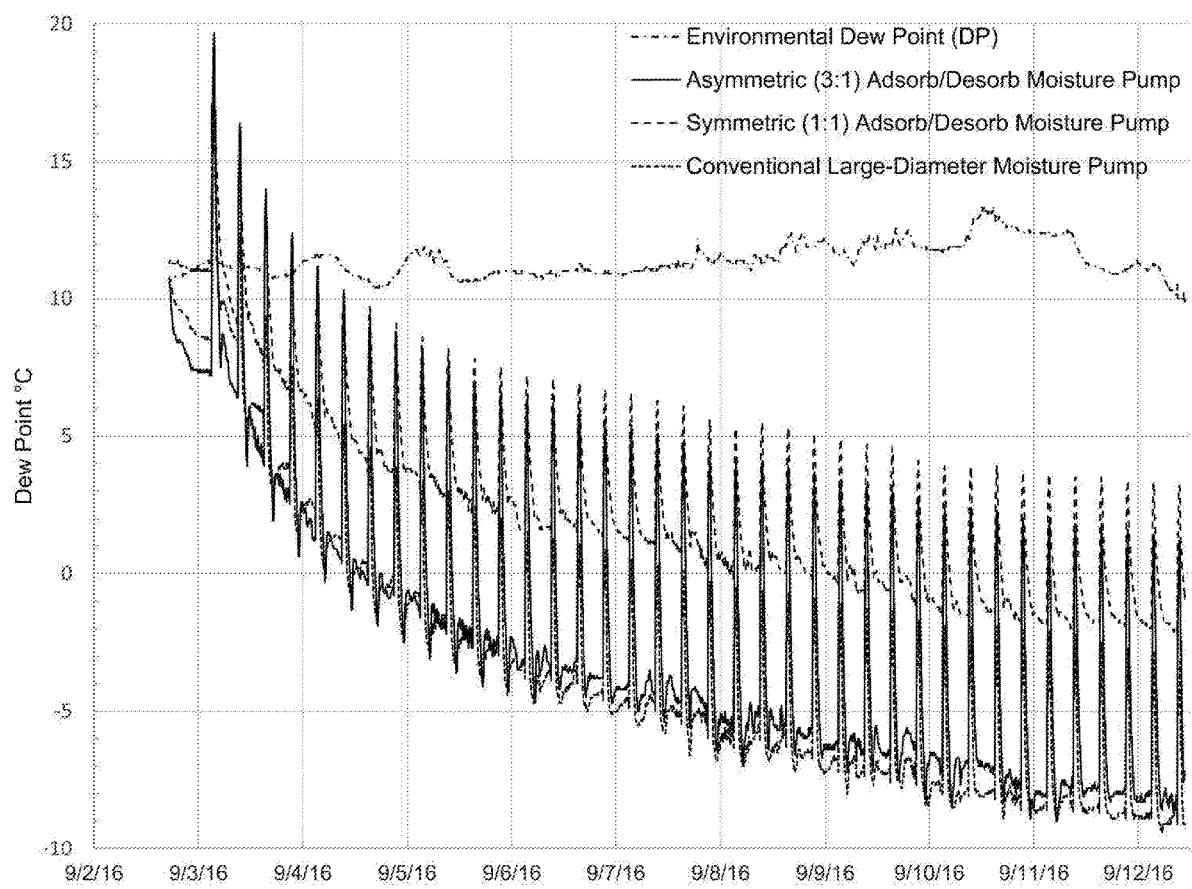

11,305,227 B2

HEATED MOISTURE PUMP HAVING A DIFFERENTIAL VALVE AREA

PRIORITY CLAIM

This patent application is a National Phase entry of PCT/US2017/055560 filed on Oct. 6, 2017, which claims priority from U.S. Provisional App. No. 62/405,475, entitled "Heated Moisture Pump Having A Differential Valve Area," filed Oct. 7, 2016, the disclosures of which are incorporated herein by reference in their entireties.

TECHNICAL FIELD

Generally, the present disclosure relates to moisture reduction in an enclosure. More specifically, this disclosure relates to a moisture pump having a heater for reducing moisture in an enclosure.

BACKGROUND

Many items are susceptible to damage caused by excessive moisture. As used herein, the term "moisture" is intended to refer to water which is diffused or condensed, whether in liquid form or vapor form, from the ambient atmosphere. For instance, electrical and electronic items may be ruined or altered due to excessive moisture. Similarly, enclosed components, e.g., those contained in a housing, that undergo thermal cycling are susceptible to moisture related problems. Examples of enclosures which are susceptible to undesirable moisture include, for example, automotive headlamp units, electronics contained in enclosed housings, and other systems where on/off cycling of a heat source within an enclosure results in moisture build-up.

One means of removing moisture from such enclosures is to provide greater airflow across, or through, the enclosure. However, when components are located in an enclosed housing it can be difficult to provide adequate airflow, where more traditional approaches to moisture reduction such as increased vent opening size can exacerbate problems such as enclosure contamination.

Another means of managing moisture in an enclosure is to place a drying agent or desiccant within the enclosure. As the terms "desiccants" or "drying agents" are used herein, they are intended to refer to any material which adsorbs water vapor from the air and is thereby able to reduce the moisture in the air in enclosed containers. However, desiccants have a limited capacity to adsorb moisture and require "regenerating" or removal of adsorbed moisture to continue functioning as a means to remove moisture in the air in an enclosure.

Another means of managing moisture in an enclosure is by way of a moisture pump, in which air is transferred from an enclosed space to a desiccant in a heating chamber during an adsorption cycle, and evaporated to the outside environment during a desorption cycle. However, existing moisture pumps are constrained in the rate at which moisture from the enclosed space can be captured without resorting to increasingly large devices.

SUMMARY

Some aspects relate to systems, methods, and devices for removing moisture from an environment. For example, some embodiments relate to a moisture pump having a differential valve area for asymmetric adsorption and desorption ports, as well as associated methods of use and manufacture.

Some embodiments relate to an apparatus comprising a housing that defines a first chamber containing a heater, with at least one adsorption port into the chamber and a desiccant positioned in the chamber proximate to the adsorption port(s). The first chamber may be referred to as a heater chamber. A heater is maintained in the heating chamber and configured to heat the heating chamber. A valve assembly is located in the housing and is transitionable between an adsorption position in which the valve assembly opens the adsorption port(s) into the heating chamber for water vapor transmission into the heating chamber, and a desorption position in which the valve assembly seals the adsorption port(s) and opens a desorption port formed between part of the housing and the valve assembly for water vapor transmission out of the heating chamber.

In some embodiments, the adsorption port and desorption port each respectively define an adsorption area and a desorption area, and the adsorption area is larger than the desorption area to provide a differential valve area. In certain embodiments, adsorption port(s) comprises a plurality of openings in the housing arrayed in a parallel set, each opening being arranged perpendicular to a direction of travel of the valve assembly. Thus, the adsorption port comprises a plurality of openings in the housing to define an adsorption area. Each opening has a width in the direction of travel of the valve assembly that is approximately equal to a width of the desorption port. The valve assembly comprises a valve assembly having a plurality of openings therein that are arranged to align with the adsorption port openings when the valve assembly is in the adsorption position, and a plurality of blocking regions disposed between the openings that are arranged to align with and block the adsorption port openings when the valve assembly is in the desorption position. The desorption port has a width approximately equal to the width of each opening of the plurality of adsorption openings. The width of each opening of the plurality of adsorption openings is preferably less than or equal to the corresponding width of a respective blocking region of the valve assembly.

In some embodiments, the adsorption port can comprise at least one opening in a wall of the housing that is proximate to and substantially parallel to the desiccant. For example, the housing can contain a void therein and the opening(s) can be positioned parallel to a surface of the desiccant and across the void from the desiccant. Where the housing is a cylindrical barrel, the desiccant can be substantially cylindrical also and positioned inside the housing and separated from the housing by a void. In some embodiments, the wall of the housing at least partially surrounds the desiccant and is removed from the desiccant by a distance, i.e. a distance that permits airflow between the wall of the housing and the desiccant. In some embodiments, the valve assembly includes a valve assembly interior to the housing and slidingly mounted within the housing, the valve assembly being operable to cover the desorption port in the adsorption position, and operable to cover the at least one adsorption port in the desorption position.

Some embodiments can include a second chamber, referred to as a condensation chamber, defined between a desorption port and a venting port having a membrane covering the venting port. The membrane can be water vapor permeable and liquid water impermeable. The valve assembly can be transitionable between an adsorption position in which the valve assembly seals the desorption port between the heating chamber and the condensation chamber with the desorption port cover and opens the adsorption port into the heating chamber for water vapor transmission into the heating chamber, and a desorption position in which the valve assembly seals the adsorption port with the adsorption port cover and opens the desorption port between the heating chamber and the condensation chamber for water vapor transmission out of the heating chamber.

Still other embodiments relate to an apparatus comprising a housing defining a heating chamber and a condensation chamber; a membrane covering the venting port; a desiccant positioned in the heating chamber; a heater maintained in the heating chamber and configured to heat the heating chamber; and a valve assembly maintained by the housing including a port covering frame positioned in the heating chamber. The housing has an adsorption port into the heating chamber, a desorption port between the heating chamber and the condensation chamber, and a venting port out of the condensation chamber. The membrane is water vapor permeable and liquid water impermeable. The valve assembly is transitionable between an adsorption position in which the valve assembly seals the desorption port between the heating chamber and the condensation chamber with the port covering frame and opens the adsorption port into the heating chamber for water vapor transmission into the heating chamber, and a desorption position in which the valve assembly seals the adsorption port with the port covering frame and opens the desorption port between the heating chamber and the condensation chamber for water vapor transmission out of the heating chamber.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 2B is a side view of the moisture pump of FIG. 2A.

FIG. 3A is a cutaway side view of the moisture pump of FIGS. 2A-2B in an adsorbing configuration.

FIG. 4 is a cutaway side view of a second example of a moisture pump in a desorbing configuration, according to some embodiments.

FIG. 5 is a cutaway side view of the moisture pump of FIG. 4 in an adsorbing configuration.

FIG. 6 is a cutaway side view illustrating the operation of the moisture pump of FIGS. 2-3 in the desorbing configuration.

FIG. 7A is a cutaway side view illustrating a first part of a desorbing operation of the moisture pump of FIGS. 4-5 in a desorbing configuration.

FIG. 7B is a cutaway side view illustrating a second part of a desorbing operation of the moisture pump of FIGS. 4-5 in a desorbing configuration.

FIG. 8 is a cutaway side view illustrating the operation of a third example of a moisture pump, according to some embodiments, in a desorbing configuration.

FIGS. 9 and 10 are schematic illustrations of test data of a moisture pump having a differential valve area compared with a moisture pump lacking the differential valve area, according to some embodiments.

DETAILED DESCRIPTION

Figure 1:
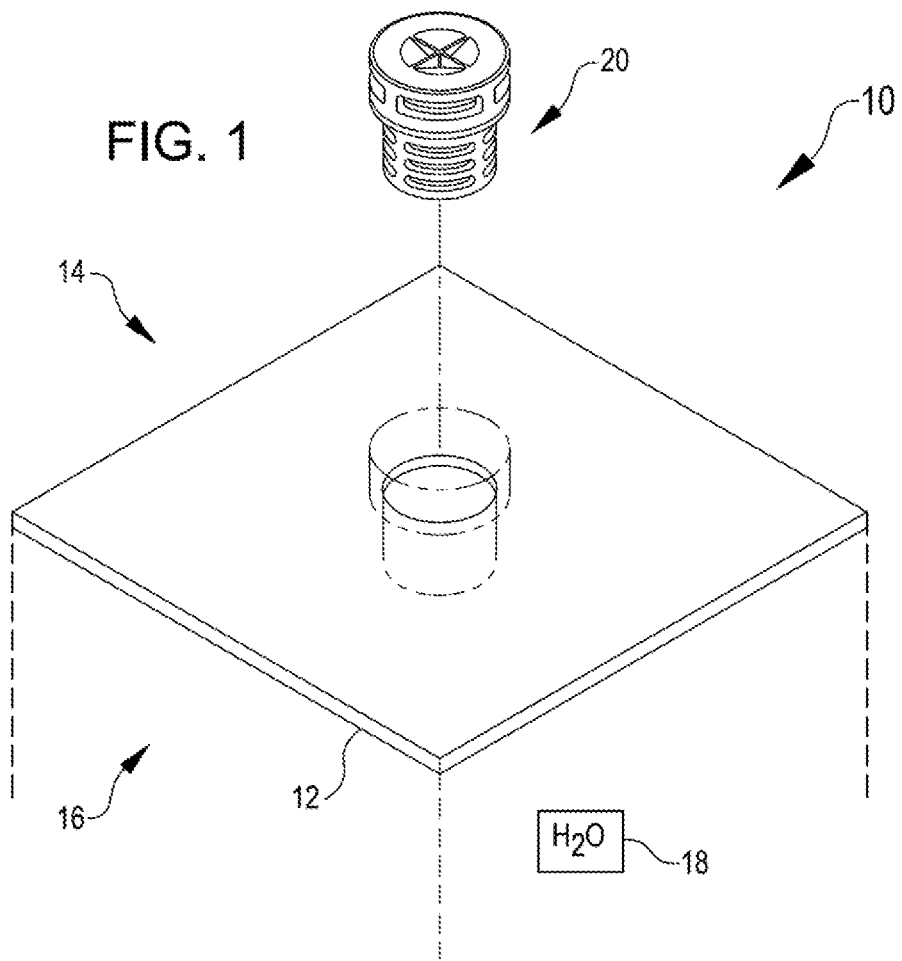
FIG. 1 is a perspective view of a system including a moisture pump, according to some embodiments.

FIG. 1 is a perspective view of a system 10 including an enclosure housing 12 defining an enclosure and separating an outside environment 14 from an inside environment 16. As used herein, "outside" and "inside" are terms used to describe spaces relative to the enclosure housing 12, which are, for example, on opposite sides of the enclosure housing. As shown in FIG. 1, the system 10 also includes a moisture pump 20 maintained by the enclosure housing 12 and in communication with the outside and inside environments 14, 16.

In some embodiments, a heating source (not shown), such as a light bulb, is positioned in the inside environment 16. The system 10 is used in an automotive application, such as a head lamp, in which the heating source cycles on and off depending on the requirements of the automotive application. Other potential applications for the moisture pump 20 include various electronic enclosures. In one example, an electronic enclosure has electronic components that function as the heating source that is cycled. Whether a headlamp or other heating source, the cycling of the heating source causes moisture 18 (e.g., moisture in the air or water vapor) to buildup in the inside environment 16 of the system 10. The presence of moisture can reduce the useful lifecycle of the heating source or other components, especially electric or electronic components, exposed to the inside environment 16 of the system 10.

As illustrated, the moisture pump 20 is positioned adjacent to the enclosure housing 12 and exposed to the outside environment 14 and inside environment 16. The moisture pump 20 directs moisture 18 out of the inside environment 16 to the outside environment 14. As shown, the moisture pump 20 has a rotationally symmetrical shape with cylindrical parts, although a variety of shapes are contemplated.

The housing 22 optionally forms at least one of an air-tight, a moisture-tight, and a water-tight seal with the enclosure housing 12. In some embodiments, the moisture pump 20 directs moisture 18 from the inside environment 16 into one or more chambers inside the housing 22 and directs moisture 18 from the one or more chambers to the outside environment 14. In this manner, the moisture pump 20 facilitates the removal of moisture 18 from the inside environment 16 to extend the useful lifecycle of the heating source or other components exposed to the inside environment 16 of the system 10.

Figure 2A:
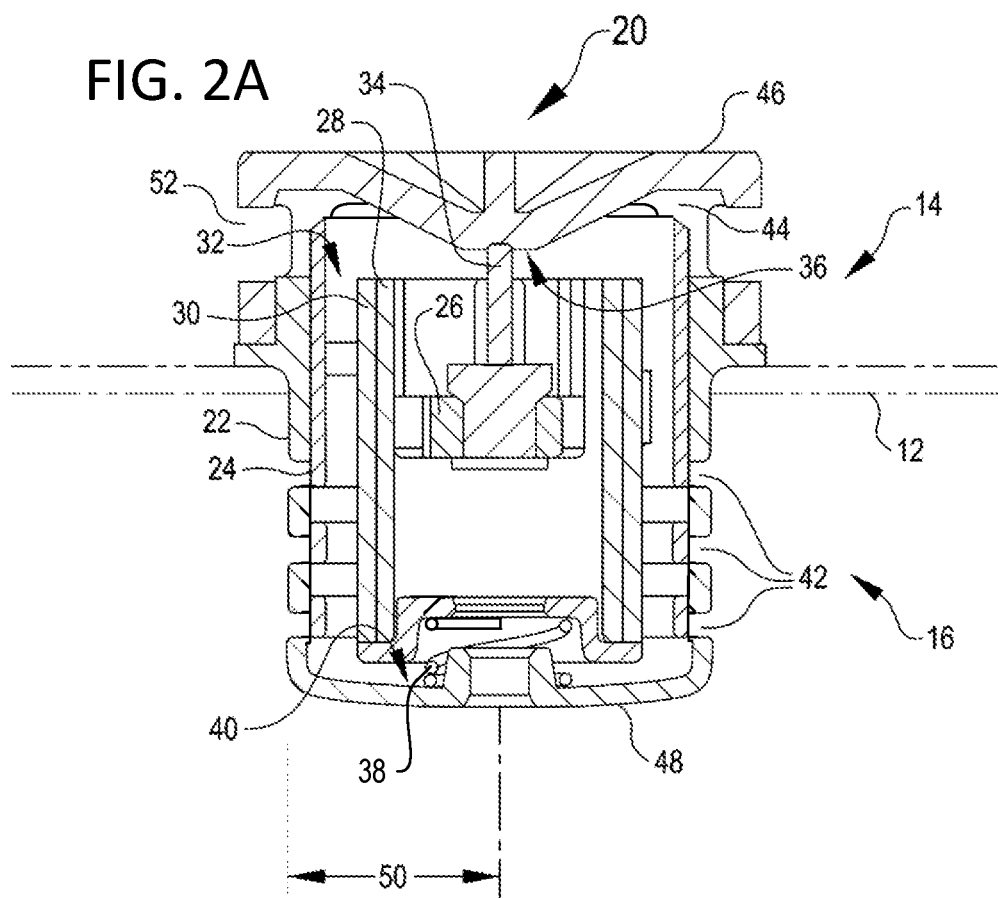
FIG. 2A is a cutaway side view of a first example of a moisture pump in a desorbing configuration, according to some embodiments.

FIG. 2A is cutaway side view of the moisture pump 20 in a desorption configuration according to some embodiments. All components herein described are shown in partial cutaway view. The moisture pump 20 includes a housing 22 containing a valve assembly 24. The valve assembly 24 includes a blocking member arranged adjacent to the housing 22, and any suitable linkage for mechanically connecting the blocking member to the actuator 34. Interior to the housing 22 is a chamber 32 containing a desiccant 30 adjacent to a heat spreader 28, which is thermally connected with a heater 26. This places the heat spreader 28 in contact with both the heater 26 and desiccant 30. An assembly of the heater 26, heat spreader 28, desiccant 30, and valve assembly 24 are biased against an inner surface 36 of a first end 46 of the housing 40 by an actuator 34; and biased against a second end 48 of the housing by a spring 38. The actuator 34 is operable to move the valve assembly 24 inside the housing 22. As shown, the actuator 34 moves the entire assembly of the heater 26, heat spreader 28, desiccant 30, and valve assembly 24 when it actuates; but in practice, an actuator may be mechanically coupled with few of the interior components of the moisture pump 20, e.g., with just the valve assembly 24.

The housing 22 defines one or more chambers for containing or transmitting moisture. As shown in FIGS. 2A and 2B, the housing 22 defines a chamber 32. In operation, water vapor is selectively transmitted into the chamber 32 (e.g., through the adsorption port or ports 42, shown closed) and, in turn, from the chamber 32 out through the desorption port 44, shown open. In certain embodiments, the chamber 32 is cylindrical, and the desiccant 30 is arranged on an outer surface of the heat spreader 28 facing outward toward the chamber, and toward an inner wall of the housing 22. The chamber 32 forms a void that surrounds the desiccant 30 and provides for moisture transfer between the desiccant 30 and air in the chamber. Vapor transmitted from the chamber 32 out from the desorption port 44 generally passes unobstructed through to the external environment 14 via a desorption opening 52. In certain embodiments, a small percentage of vapor may condense on surfaces inside the opening 52, which overhangs the desorption port 44 to prevent or mitigate intrusion of foreign objects and external moisture. In general, "desorption port" refers to the region where the valve assembly 24 transits to block airflow between the chamber 32 and the external environment 14. The desorption port 44 may be separated from the external environment 14 by an additional volume of air (e.g. opening 52); or may connect directly to the external environment.

The housing 22 is formed generally in the shape of a cylinder having one or more diameters. The housing 22 optionally includes one or more openings (not shown) for housing an electrical conductor (not shown). The electrical conductor allows for the delivery of electrical power to the interior of housing 22, such as to heater 26. In certain embodiments, the valve assembly 24 and the housing 22 may both be in the form of cylinders, with the valve assembly 24 nested inside the housing.

The moisture pump 20 according to some embodiments includes a desiccant 30 (shown in partial cutaway), a heater 26, and a heat spreader 28 (shown in partial cutaway). The moisture pump 20 generally operates to remove moisture from air entering the moisture pump 20 and return the moisture to air exiting the moisture pump 20. The desiccant 30 is configured to adsorb water vapor from the air in the chamber 32, generally, when not heated. Non-limiting examples of desiccant forms include but are not limited to: beads glued onto a scrim, a solid tablet (e.g., having an adsorbent plus binder), cloth (e.g., knit, woven, or nonwoven), a desiccant material plus polytetrafluoroethylene (PTFE) (e.g., silica gel filled PTFE), or a flexible desiccant layer, e.g. a flexible PTFE containing a desiccant material. Although not limited to any particular shape, the desiccant 30 is shown formed in a cylindrical shape.

In the illustrated embodiment, the heater 26 directs heat to the heat spreader 28 for heating the desiccant 30. The heater 26 is optionally powered through an electrical conductor operatively coupled thereto, which is positioned through one or more openings of the housing 22. A non-limiting example of a heater 26 is a positive thermal coefficient (PTC) heater. In some embodiments, the PTC heater is self-regulating. As illustrated, the heat spreader 28 is positioned adjacent to the heater 26 to receive heat generated by the heater. As shown, the heat spreader 28 is in conductive contact with the heater 26 to be thermally coupled therewith although other heat transmission modes (e.g., radiant) are acceptable. The heater 26 may also be secured to the heat spreader 28. As shown, the heater 26 is positioned adjacent to the heat spreader 28 and adjacent to the actuator 34. As illustrated, a generally cylindrical portion of the heat spreader 28 is in conductive contact with the desiccant 30. In some embodiments, the heat spreader 28 is mechanically connected with the desiccant 30, e.g. by a connector (not shown). In some other embodiments, the desiccant 30 may be adhered to the heat spreader 28, or may be fitted, e.g. stretched or formed around the heat spreader. Heater 26 may be powered by AC or DC current. In many applications, DC current is readily available as the source for the heater 26. Heater 26 can be selected to draw on the available voltages in the application. Selecting a heater to work with available voltages can decrease overall system costs. In certain embodiments, for a broad array applications, including but not limited to automobiles, computer systems, lighting, and electronic enclosures, the DC voltages may from 2V to 80V, e.g., from 2V to 24V or from 10V to 16V.

The heater 26 can be selectively powered to generate heat. Though a portion of the heat may be dissipated through the air (e.g., via convection) or other components, generally a significant portion of generated heat is absorbed into the heat spreader 28. At least a portion of the heat in the heat spreader 28 is absorbed (e.g., via conduction) into the desiccant 30. Water vapor adsorbed in the desiccant 30 is heated and released from the desiccant 30 into air in the chamber 32, for example, when the heat pump 20 is in the desorption configuration. When the heater 26 is not powered (i.e. in the adsorption configuration), and the desiccant 30 is sufficiently cooled, the desiccant 30 adsorbs water vapor in the air.

In operation, the moisture pump 20 is transitionable between an adsorption configuration and a desorption configuration. FIGS. 2A and 2B shows the desorption configuration, in which the valve assembly 24 is positioned in a desorption position, such that the adsorption port 42 (shown here as multiple adsorption openings) is blocked by the valve assembly 24, and the desorption port 44 is open between the first end 46 of the housing 22 and the valve assembly 24. This desorption position blocks airflow between the interior 16 and the chamber 32, while allowing airflow between the chamber 32 and the exterior 14. The moisture pump 20 is generally in the desorption configuration when the heater 26 is actively heating the heat spreader 28 and desiccant 30, such that moisture contained in the desiccant 30 is being vaporized out from the desiccant and allowed to exit the moisture pump 20 through the desorption port 44.

The moisture pump 20 can be held in the desorption configuration by the actuator 34, which presses against the inner surface 36 of the first end 46 of the housing 22. In various embodiments, the actuator 36 is a thermomechanical actuator responsive to temperature. In some embodiments, the actuator 36 includes a phase change material, e.g., a phase change drive. As used herein, a phase change material expands or contracts in response to temperature such that, for example, the phase change material expands in response to being heated and contracts in response to cooling down. Non-limiting examples of phase change materials include wax (e.g., paraffin wax), bimetal elements, and Nitinol. The actuator 36 is mechanically connected with the valve assembly 24 so that, when the actuator expands and contracts, the valve assembly can move between the adsorption and desorption positions.

The moisture pump 20 can be held in the desorption configuration for a predetermined period of time, i.e., a desorption or regeneration time period sufficient for the removal of moisture from the desiccant. The desorption or regeneration time period is a comparatively fast process. Active heating of the desiccant 30 removes moisture from the desiccant, regenerating the desiccant, and heating of the chamber 32 causes strong convective air currents that help transport moisture out of the moisture pump 20 relatively quickly. Due to the heat-driven convection, the desorption port 44 can have a relatively small area without impairing the ability of the moisture pump 20 to exhaust moisture. In certain embodiments, the desorption or regeneration can be achieved by heating the desiccant to a desorption temperature that is greater than or equal to 95° C. In some embodiments, the desorption temperature may range from about 110° C. to about 135° C.; or from about 105° C. to about 150° C.

Once the desiccant is sufficiently regenerated, typically after 10-30 minutes, any further time heating is wasted power and heat. Further, because the valves assembly 24 is arranged to prevent access between the interior 16 of the protected enclosure and the chamber 32 when in the desorption configuration, there is no moisture reduction function during the desorption (regeneration) period. Therefore, it is desired to heat the chamber 32 for a relatively short time as compared to an adsorption time period.

FIG. 2B shows the moisture pump 20 of FIG. 2A in the desorption configuration from a side perspective (exterior) view. As shown, the valve assembly 24 is lowered to the desorption position, opening the desorption port 44, which is visible through the desorption opening 52. The adsorption port 42 is closed by the valve assembly 24.

FIG. 3A is cutaway side view of the moisture pump 20 of FIG. 2A, shown in the adsorption configuration. The adsorption configuration differs from the desorption configuration in that the valve assembly 24 is positioned in the adsorption position within the housing 22, such that that adsorption port 42 (shown here as multiple adsorption openings) is unobstructed while the desorption port 44 is closed. The moisture pump 20 can be held in the adsorption configuration by, e.g., a spring 38, which is biased to oppose the actuator 34. When the actuator 34 is retracted (e.g., for a phase change drive, when the actuator is cooled and contracts), the spring 38 causes the valve assembly 24 to move into the adsorption position. When the heater 26 does not deliver heat to the chamber 32, actuator 34 and the desiccant 30 cool down. In response, the actuator 34 contracts, and the desiccant 30 adsorbs water vapor in the air of the chamber 32. In operation, the open adsorption port 42 of the moisture pump 20 provides for transfer of air between the interior 16 and the chamber 32, so that the desiccant 30 adsorbs moisture transferred from the interior 16.

In contrast with the desorption or regeneration or time period, the adsorption of moisture from the enclosure into device may take a longer time period. When the moisture pump 20 is not heated, there is a smaller available temperature difference to drive convection, so moisture diffusion from the interior 16 to the chamber 32 may often be the primary transport method from the interior of the protected enclosure through the adsorption port 42 and into the desiccant 30. In moisture diffusion transport, moisture in air concentration differences between the enclosure to be protected and inside the HMP near the desiccant often are relatively small slowing the moisture transport. During the adsorption time period, since diffusion is a slower transport method than convection, the cumulative area of the adsorption port 42 can a limiting performance factor to moisture movement from the interior 16 into the chamber 32 where it can be adsorbed by the desiccant 30. This is also true if there were are convective currents caused by a temperature difference between the chamber 32 and the interior 16, e.g. those caused by a light source.

In embodiments, the adsorption port 42 can have a differential valve area than the desorption port 44. The asymmetry of the areas of the adsorption and desorption port can provide for more rapid adsorption of moisture during an adsorption period in which the moisture pump 20 is in the adsorption configuration. The effectiveness of the desorption port at venting moisture during the desorption period is unaffected by having a smaller area. As shown in FIGS. 2-3, the adsorption port 42 includes multiple openings arranged circumferentially around the housing 22. Thus, the adsorption area can be defined by a total of the open areas of all openings that make up the adsorption port 42. For example, an adsorption area can be defined in terms of the height of each opening comprising the adsorption port 42, the circumference (which can be defined in terms of the radius 50 of the housing 22), and the number of rows of openings that comprise the adsorption port, less any supporting structure of the housing that obstructs the openings. In contrast, the desorption area is defined in terms of the desorption port 44 (see FIG. 2A), in which case the desorption area can be defined in terms of the height of the desorption port and the circumferences of the housing 22. In general, the height of each opening of the adsorption port 42 will be approximately equal to, or slightly less than, the height of the desorption port 44. Thus, in general, the adsorption area of the moisture pump will exceed the desorption area by a factor that is about equal to, or slightly less than, the number of parallel rows of openings that comprise the adsorption port 42. In certain embodiments, the parallel rows of openings comprising the adsorption port 42 run perpendicular to a direction of travel of the valve assembly 24, and are offset from one another in the direction of travel of the valve assembly. In some specific embodiments, the adsorption area can be between 800 and 1000 mm$^2$, between 700 and 1000 mm$^2$, between 600 and 1000 mm$^2$, between 500 and 1000 mm$^2$, or between 500 and 1200 mm$^2$.

In alternative embodiments, the valve assembly 24 may have a variable size (e.g. a stepped size at the adsorption port that is less than, or greater than, the size of the valve assembly at the desorption part). For example, in some embodiments, the moisture pump 20 may have a substantially cylindrical housing 22 at the adsorption port 42, and a substantially cylindrical housing at the desorption port 44, but have a stepped radius of the housing that differs between the adsorption and desorption ports. Under this configuration the valve assembly 24 can also have a stepped radius and be configured to nest inside the housing 22.

Figure 3B:
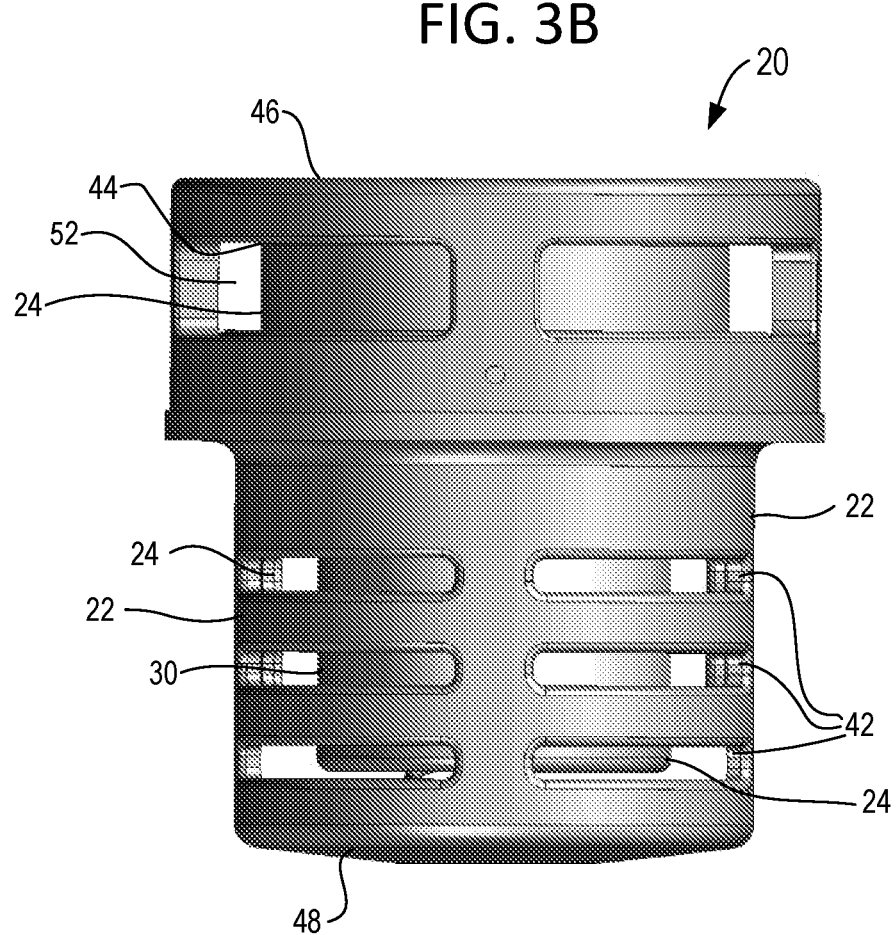
FIG. 3B is a side view of the moisture pump of FIG. 3A.

FIG. 3B shows the moisture pump 20 of FIG. 3A in the adsorption configuration from a side perspective (exterior) view. As shown, the valve assembly 24 is raised to the adsorption position, opening the adsorption port 42 and closing the desorption port 44. The desiccant 30 is visible through the adsorption port 42.

In the configurations shown in FIGS. 2-3, and in similar configurations, the adsorption area can be increased by increasing the number of rows of openings that comprise the adsorption port 42. Thus, the height and circumference of each row of openings of the adsorption port 42 do not limit the adsorption area, because additional rows of openings can be provided. In contrast, moisture pumps that employ a single adsorption port must provide sufficient travel of an adsorption valve to provide sufficient adsorption area; or must provide a larger radius of the adsorption valve. Thus, the configurations shown in FIGS. 2-3 can provide adequate adsorption area with smaller travel than conventional moisture pumps, and in a device with a smaller footprint. By way of example, in some embodiments, sufficient adsorptive efficiency can be provided in a moisture pump with a radius of 20 mm or less, e.g., 25 mm or less, or 30 mm or less. In certain embodiments, three or more rows of openings may be provided in the adsorption port 42, each of which may have individual heights of 3 mm or less, e.g., 3.5 mm or less, or 4.0 mm or less. In certain embodiments, the height of the adsorption port 42 may vary from row to row and in other embodiments, the adsorption ports 42 in each row has the same height. The height of the desorption port may be 3 mm or less, e.g., 3.5 mm or less, 4.0 mm or less, or 5.0 mm or less. Due to the number of rows the total height of the adsorption ports 42 provides a differential valve area compared to the area the desorption port 44. The total height of the adsorption port is greater than the height of the desorption port 44, e.g., at least twice as large or at least three times as large. In some embodiments, more than three rows of openings may be provided in the adsorption port 42, depending on the application and on the depth to which the moisture pump 20 is permitted to penetrate into the interior 16. For example, in applications requiring low adsorption rates, the adsorption port 42 can comprise two or three rows of openings. In applications requiring greater adsorption rates, the adsorption port 42 can comprise three or more rows of openings. In certain embodiments, the height of the desorption port 44 can be equal to a distance that the valve assembly 24 is permitted to travel (i.e. the valve travel). The heights of individual windows making up the adsorption port 42 can also be equal to, or less than, the valve travel. In some embodiments, the windows of the adsorption port may be slightly narrower than the distance of the valve travel to ensure that air cannot pass around the valve assembly at the adsorption port 24 when the adsorption port is closed.

The configuration of the adsorption port 42 can also affect the efficiency of the adsorption process by providing a shortened path for airflow and/or moisture diffusion in the interior 16 to encounter the desiccant 30. In certain embodiments, and as shown in FIGS. 2-3, the adsorption port 42 comprises multiple rows of openings that are positioned around and encompassing at least part of the desiccant 30 across a region of the chamber 32. In this and similar arrangements, the air from the interior 16 can readily pass through the adsorption port 42 at many points around the circumference of the housing 22, and readily encounter the desiccant 30 without having to traverse the chamber 32. This arrangement contrasts with moisture pumps that have a singular adsorption port at one side or end, in which case, air entering the moisture pump would first encounter only a small part of the desiccant.

The desiccant 30, heater 26, and heat spreader 28 are shown positioned in or maintained in the chamber 32. The desiccant 30 is exposed to the moisture in the air of chamber 32. In other embodiments (not shown), one or more of the desiccant 30, heater 26, and heat spreader 28 may be partially positioned in the chamber 32. In yet other embodiments (not shown), the heater 26 may be positioned outside of the chamber 32 and the heat spreader 28 is position in or partially positioned in the chamber 32. Embodiments described above refer primarily to a substantially cylindrical moisture pump 20, however, it will be understood that the principles herein described may be applied with reference to any other suitable shape where a valve assembly 24 can be slidingly positioned within a housing 22. In various alternative embodiments, the housing 22 and associated valve assembly 24 can have an elliptical cross section, rectangular cross section, or any other suitable cross section. As discussed above, various alternative embodiments may also employ stepped cross-sectional areas.

Embodiments shown in FIGS. 2-3 are operable without a second chamber, e.g., condensation chamber, and air can flow directly into the exterior environment 14 from the chamber 32 when the moisture pump 20 is in the desorbing configuration. In other embodiments, a condensation chamber may be included.

FIGS. 4-5 are cutaway side views of a moisture pump 120 that has a condensation chamber 158. FIG. 4 shows the moisture pump 120 in a desorption configuration, and FIG. 5 shows the moisture pump 120 in an adsorption configuration. Moisture pump 120 shares similar components to moisture pump 20, which are labeled by the addition of a '1' digit to common reference numbers (e.g. housing 22 of FIGS. 2-3 is analogous to housing 122 of FIGS. 4-5). Aspects of the moisture pump 120 can operate in a similar manner to the moisture pump 20 described above, e.g., the valve assembly 124 can move between desorbing and adsorbing positions when acted on by the actuator 134. The moisture pump 120 may operate in place of the moisture pump 20 in systems like system 10 shown in FIG. 1.

The moisture pump 120 of FIGS. 4-5 includes a venting port 154 defining a condensation chamber 158. In operation, when the valve assembly 124 is in the desorption position (as shown in FIG. 4), the desorption port 144 is open and air containing moisture can escape the chamber 132 through the desorption port. The moisture-containing air can further pass out of the moisture pump 120 through the condensation chamber 158 and subsequently through a membrane defining the venting port 154. When the valve assembly 124 is in the adsorption position (as shown in FIG. 5), the desorption port 144 is closed, separating the condensation chamber 158 from the chamber 132. Thus, in the adsorption position, the condensation chamber 158 is in fluid communication only with the external environment 14 through the venting port 154. While the valve assembly 124 is in the adsorption position, air containing moisture can circulate from the internal environment 16 into the chamber 132 where the desiccant 130 can adsorb moisture therefrom; and moisture already contained in the condensation chamber 132 can pass out through the venting port 154.

The venting port 154 provides an opening for water vapor transmission out of the condensation chamber 158 and to, for example, the outside environment 14 of the system 10 (FIG. 1). Water vapor collects in the condensation chamber 158 during desorption and exits the venting port 154 out of the condensation chamber 158. In certain embodiments at least a portion of the water vapor precipitates inside the condensation chamber before being transmitted out of the condensation chamber 158. For example, condensed liquid water can evaporate over time into the air of the condensation chamber 158 while the desorption port 144 is closed (i.e. in the adsorption configuration) and subsequently pass through the venting port 154 or out of a drain portion (not shown). In certain embodiments, the membrane or membranes making up the venting port 154 can be water vapor permeable but impermeable to debris and liquid water, so as to prevent intrusion or debris or liquid water from the outside environment 14 into the moisture pump 120. One or more membranes may also be present covering the adsorption ports 142 (not shown), e.g. to prevent particles freed from the desiccant 30 from entering the inside environment.

Membranes used in the moisture pump 120 can include one or more membranes, or layers of membranes, configured for various purposes. One purpose of the one or more membranes is to prevent solid debris from entering or leaving the moisture pump 120, such as preventing particles (e.g., dust) from entering from the outside environment 14 (FIG. 1) into the moisture pump. Another purpose of the one or more membranes is to allow air and water vapor to be transmitted therethrough. Yet another purpose of the one or more membranes is to prevent liquid water from being transmitted therethrough. Still another purpose of the one or more membranes is to discourage oils from building up on the membrane. In some embodiments, the one or more membranes are solid debris impermeable, air permeable, vapor permeable (e.g., water vapor permeable), water impermeable, and oleophobic in response to the one or more purposes selected. Examples of suitable membrane materials include ePTFE membranes, such as those described in U.S. Pat. Nos. 6,210,014, 6,709,493, and 8,968,063.

Air and vapor permeable, liquid impermeable membranes are often characterized by their ability to prevent liquid from passing through them. Water entry pressure (WEP) is a common performance metric of such membranes. WEP is determined by placing water in contact with one side of the membrane. The pressure of the water is gradually increased until the water enters the membrane and begins to exit the opposite side. The pressure at which the water begins to exit the opposite side is called the water entry pressure. In certain embodiments, the membrane with a WEP of at least 0.03 bar (0.5 psi) may be used, e.g., a WEP of at least 0.2 bar (3 psi) or a WEP of at least 0.35 bar (5 psi).

FIG. 6 illustrates aspects of the operation of the moisture pump 20 of FIGS. 2-3 in the desorbing configuration, in accordance with embodiments. As shown, while the valve assembly 24 is in the desorbing position, the desiccant 30 is being heated, e.g., via the heat spreader 28, causing the desiccant to release water vapor 60. The water vapor 60 is entrained in a convective flow 62 out of the moisture pump 20 through the desorption port 44 and desorption opening 52.

FIG. 7A illustrates aspects of the operation of the moisture pump 120 of FIGS. 4-5 in the desorbing configuration, in accordance with embodiments. As shown, while the valve assembly 124 is in the desorbing position, the desiccant 130 is being heated, causing the desiccant to release water vapor 60. Some of the water vapor 60 is entrained and transferred out of the moisture pump 120 through the open desorption port 144, condensation chamber 158, and vent port 154. Some of the water vapor 60 may also condense inside the condensation chamber 158, which is generally cooler than the chamber 132, which may form condensates 64. The vent port 154 is operable to prevent intrusion of some substances into the moisture pump 120, e.g. debris, liquid water, oils, and/or other substances.

FIG. 7B illustrates further aspects of the operation of the moisture pump 120 of FIGS. 4-5. Following the desorption cycle illustrates in FIG. 7A, the moisture pump 120 may revert to an adsorption configuration by ceasing to heat the desiccant 130 and closing the desorption port 144. While in the adsorption configuration, the moisture pump 120 can continue to exhaust moisture as the condensates 64 evaporate into the condensation chamber 158 and subsequently diffuse across the membrane or membranes comprising the venting port 154.

FIG. 8 illustrates aspects of the operation of a third example of a moisture pump 220, in a desorbing configuration, in accordance with embodiments. Moisture pump 220 contains elements similar to elements of moisture pumps 20 and 120, which are labeled by substituting a '2' in the hundreds place of the respective reference numeral (e.g. housing 222 is analogous to housing 22 or 122). A desorption port 244 may allow air to exit directly from the chamber 232 without passing through an intervening desorption opening (e.g. desorption opening 52, FIGS. 2-3 and 6) or through a condensation chamber and venting port (e.g. condensation chamber 158 and venting port 154, FIGS. 4-5 and 7). As shown, valve assembly 224 is in the desorption position, so that the desorption port 244 is open. The valve assembly is transitionable to an adsorption position 224', in which the desorption port 244 is closed. In some embodiments, desorption port 244 may include a membrane similar to any of the membranes discussed above.

The desiccants herein described, e.g. desiccant 30 (FIGS. 2A-2B), can comprise a flexible desiccant layer, which provides for several advantages. A flexible desiccant layer allows for conformability to the heat spreader (e.g. heat spreader 28) which can enhance heat transfer. For example, a flexible desiccant 30 can conform to an exterior surface of the heat spreader 28 in the moisture pump 20 shown in FIG. 2A. The flexible desiccant form can withstand flexing, such that the desiccant can be manufactured as a flat surface and installed by flexing the desiccant to emplace within the housing 22 or around a heat spreader 28. In certain embodiments, flexible desiccant material may be capable of conforming to a curvature with a radius of less than three millimeters, e.g., less than one millimeter, or less than 0.5 millimeter, without producing particulates. Flex durability can be measured in a simple mandrel roll test where the flexible desiccant form is rolled onto a mandrel in both X and Y directions at a small radius without visible surface cracking or particle generation. For example, a suitable flexible desiccant, e.g. a flexible polytetrafluoroethylene (PTFE) matrix containing silica gel, was subjected to the mandrel test with a 0.125 inch radius mandrel at a rate of 0.16 in/sec in both the X & Y directions with no visual surface cracking or particle generation observed with an optical microscope under 1.5× to 2× magnification. Non-limiting examples of flexible desiccant forms include but are not limited to a desiccant material plus polytetrafluoroethylene (PTFE) (e.g., silica gel filled PTFE). In certain embodiments, a desiccant layer may include a fluoropolymer and a metal oxide or gel thereof. In certain other embodiments, a desiccant layer may include a silica gel filled PTFE. In some embodiments, a desiccant layer may include one or more of: beads glued onto a scrim, a solid tablet, a cloth, a woven, a non-woven, or a flexible polytetrafluoroethylene layer.

The flexible desiccant layer can be assembled with heating chamber having a variety of internal dimensions by flexing the desiccant layer. The flexible desiccant layer can also be arranged to provide a ratio of surface area to volume, which can enhance adsorption of water vapor, by winding a desiccant in a heating chamber.

In certain embodiments, desiccant forms which are not flexible may be avoided in favor of flexible forms. Both flexible, and inflexible, desiccant forms may have a substantially uniform thickness. In certain embodiments, a desiccant layer may have a thickness variation of less than 0.5 mm, or in some cases less than 0.25 mm. In certain embodiments, desiccant materials other than silica gel may be used in combination with a PTFE or similar membrane substrate or matrix, e.g. by embedding or impregnating a membrane substrate or matrix with desiccant material such that the membrane substrate or matrix captures the desiccant material and prevents escape of desiccant dust or debris from the membrane matrix In one embodiment provided with a flexible desiccant layer, the desiccant material may be sufficiently strong to prevent particles from being released. This prevents a loss of desiccant material thereby increasing lifetime. In addition, the release of fewer particles reduces the need for a debris chamber or other means for removal of particles from the internal environment. Flexible desiccant layers may also increase the packing efficiency of desiccant in the chamber by providing for greater concentrations of desiccant in the desiccant layer. High desiccant loading in a flexible desiccant allows for smaller (i.e. thinner) layers of flexible desiccant to achieve an effective total desiccant load for drying an enclosure. For example, in some embodiments, the packing efficiency of flexible desiccant layer may be more than 50% by mass (i.e., a mass of the dry desiccant layer may be 50% or more desiccant compared to 50% or less flexible substrate or matrix). In some cases, the packing efficiency of desiccant in the desiccant layer may be more than 90% by mass. In at least one embodiment, the moisture pump may use 3-4 grams of desiccant material for an enclosure having a protected volume of 6 L to 14 L volume of the enclosure that is to be protected by the moisture pump. The 3-4 grams of desiccant material can be provided in a desiccant layer having a thickness of about 2 mm, and an outside face surface area of about 3414 $mm^2$. In some embodiments, more than 4 grams of desiccant material can be included in the desiccant layer.

In certain embodiments, the flexible desiccant layer 26 may include a high-temperature (HT) desiccant capable of withstanding temperatures in excess of 95° C., e.g. in excess of 105° C., or in excess of 150° C. In general, withstanding a high temperature means that an HT desiccant can retain its desiccant properties and structural properties (i.e. remain structurally sound or stand under its own weight) at high temperature. Flexible desiccant may also be HT desiccants. Generally, HT desiccants can regenerate their ability to adsorb vapor when heated repeatedly. Heat drives off moisture from the desiccant, thereby restoring its adsorptive capacity in a shorter period of time. Some HT desiccants can desorb at least 15% of their 22° C./50% RH equilibrium moisture content when heated to 95° C. in about 5 minutes or less; or at least 25% of their 22° C./50% equilibrium moisture content when heated to 101° C. in about 5 minutes or less. It will be understood that the specific times to regenerate a desiccant layer may depend on the desiccant thickness, the specific temperature, the ambient humidity, the efficiency of heating, and other factors. In some embodiments, the desiccant can desorb at least 40% of captured moisture at a 22° C./50% RH equilibrium moisture content within 20 minutes at a desorption temperature of 95° C. In some other embodiments, the desiccant can desorb at least 60% of captured moisture at a 22° C./50% RH equilibrium moisture content within 20 minutes at a desorption temperature of 95° C. To desorb quickly, a desiccant (e.g. an HT desiccant) can be heated to temperatures of 105° C. or greater. For temperatures in the 105° C. range and greater, the desiccant and any structural materials associated with the desiccant should be resistant to melting and deformation at those high temperatures for long periods of time, e.g., for up to 3 hours. Specific desiccants and structural materials operable above 105° C. include flexible PTFE impregnated with a silica gel desiccant material. In some embodiments, the desiccant is fixed to the heat spreader (e.g. desiccant 30 and heat spreader 28) by an epoxy adhesive layer that can survive temperatures up to about 150° C. In some embodiments, a heat pump may be configured to operate at temperatures greater than 150° C. In such cases, a desiccant, including desiccants comprising silica gel-impregnated PTFE, may tolerate temperatures in excess of 175° C. or 200° C., HT desiccants can be attached with a heat spreader by attachment means tolerant to temperatures in excess of 150° C. including, but not limited to, high-temperature tolerant adhesives and mechanical means. For example, in some embodiments, an HT desiccant can be attached with a heat spreader by way of a high-temperature tolerant mesh, net, or cage surrounding the desiccant and heat spreader without obstructing airflow to the desiccant. Such a mesh, net, or cage may be formed of a high-temperature polymer, metal, or other suitable material.

EXAMPLES

The present invention will be better understood in view of the following non-limiting examples.

Test Data for Embodiments with Asymmetric Adsorb/Desorb Areas

FIG. 9 is a graphical representation showing test data of a moisture pump having an asymmetric ratio adsorption port area to desorption port area compared to a moisture pump having similar dimensions but lacking the asymmetry, in accordance with embodiments. The moisture pumps were placed in an environmental chamber and each affixed to a model enclosure (a lamp fixture with an approximate volume of 13 L). The humidity of the external environment was measured and recorded in terms of the environmental dew point (DP), and the humidity of the model enclosures was measured in terms of the dew points of the respective enclosures. The inventive (asymmetric) and comparison (symmetric) moisture pumps were subjected to repeated desorption cycles for 30 minutes at 6-hour intervals, separated by adsorption cycles for the remainder of the period. The asymmetric moisture pump rapidly adsorbed moisture from its respective enclosure by comparison to the symmetric moisture pump, as shown by the asymmetric moisture pump achieving significantly lower dew points than the symmetric moisture pump. In fact, the asymmetric moisture pump achieved low dew point values of approximately −2.0° C. within about 8-10 cycles, whereas the symmetric moisture pump achieved similar results near its operating limit after about 35 cycles. The asymmetric moisture pump appears to achieve an operating limit with dew points that are significantly lower than those achievable with a symmetric moisture pump, e.g. less than −8.0° C. after about 35 cycles.

FIG. 10 is a graphical representation showing the data of FIG. 9 with the addition of data from a conventional, in-line moisture pump, having an adsorption port at one end and a desorption port at the opposite end, and a large-diameter adsorption port having an adsorption port total area of about 1000 mm. The large-diameter device was attached with a model enclosure inside an environmental chamber in the same manner as the symmetrical and asymmetrical moisture pumps described above with reference to FIG. 9. The large-diameter device extended about 23.5 mm into the model enclosure and had a diameter of about 61 mm. By comparison, the asymmetric moisture pump compared in this test projected 40 mm into its respective model enclosure, but had a much smaller diameter of only about 44.4 mm, and a total adsorption area of approximately 850 $mm^2$. The data illustrate that the asymmetric moisture pump is able to achieve comparable performance at dehumidifying an enclosure to the much larger conventional moisture pumps with a much smaller device size.

Various modifications and additions can be made to the exemplary embodiments discussed without departing from the scope of the present invention. While the embodiments described above refer to particular features, the scope of this invention also includes embodiments having different combinations of features and embodiments that do not include all of the above described features. For example, the modifications described with respect to each moisture pump 20, 200, 400 may also be applied to any of the moisture pump embodiments described herein.

The following is claimed:

1. An apparatus comprising:
   a) a housing comprising:
      i. a first chamber having a heater,
      ii. at least one adsorption port into the first chamber, and
      iii. a desiccant disposed proximate to the at least one adsorption port;
   b) a valve assembly located within the housing and being transitionable between an adsorption position and a desorption position, where in the adsorption position the at least one adsorption port is open and when in the desorption position a desorption port is formed between the valve assembly and the housing, and
   c) a heat spreader disposed in the first chamber and in contact with the heater and the desiccant;
   wherein the at least one adsorption port defines an adsorption area and the desorption port defines a desorption area, and the adsorption area is larger than the desorption area.

2. The apparatus of claim 1, wherein:
   the at least one adsorption port comprises a plurality of openings in the housing to define the adsorption area.

3. The apparatus of claim 1, wherein:
   the desiccant comprises a flexible material capable of conforming to a curvature with a radius of less than three millimeters without producing particulates.

4. The apparatus of claim 1, wherein the desiccant comprises a material having a substantially uniform thickness.

5. The apparatus of claim 1, wherein an inner wall of the first chamber is cylindrical,
   wherein the desiccant is arranged and facing the inner wall of the first chamber across a void.

6. The apparatus of claim 1, wherein:
   the at least one adsorption port comprises a plurality of openings in the housing arrayed in a parallel set of openings, each opening being arranged perpendicular to a direction of travel of the valve assembly such that, when the valve assembly cycles between the adsorption position and the desorption position, each opening of the at least one adsorption port becomes blocked or unblocked by the valve assembly, and
   each opening of the plurality of openings being blocked in the desorption position and unblocked in the adsorption position.

7. The apparatus of claim 1, wherein:
   the housing is cylindrical and has an exterior radius at the at least one adsorption port of less than or equal to 25 mm, and
   the adsorption area is at least 850 mm².

8. The apparatus of claim 1, wherein the adsorption area is at least two times the desorption area.

9. The apparatus of claim 1, wherein:
   the valve assembly comprises a blocking member having a plurality of blocking member adsorption openings corresponding to a plurality of adsorption openings in the housing and a plurality of blocking regions disposed between valve assembly adsorption openings, and
   a first width of each adsorption opening of the plurality of adsorption openings is less than or equal to a second width of a corresponding blocking region such that, when the valve assembly is in the desorption position, each opening of the plurality of adsorption openings is blocked by a corresponding blocking region of the blocking member.

10. The apparatus of claim 1, wherein the desiccant has a packing efficiency of 50% to 90% by mass.

11. The apparatus of claim 1, wherein the desiccant comprises a fluoropolymer and a metal oxide or gel thereof.

12. The apparatus of claim 1, wherein the desiccant withstands temperatures of at least 95° C. without deforming under its own weight.

13. The apparatus of claim 1, wherein the heater is configured to heat the desiccant to a desorption temperature that is greater than or equal to 95° C.

14. The apparatus of claim 1, wherein the desiccant has a flex durability, as measured in a mandrel roll test, wherein the desiccant can be rolled onto a mandrel at 0.125 inches radius or less at a rate of 0.16 in/sec in both X and Y directions without visible surface cracking and without generation of particles observable under an optical microscope under 1.5 X to 2X magnification.

15. The apparatus of claim 1, further comprising a condensation chamber defined by a venting port between the desorption port and an exterior environment and outside the first chamber, the venting port comprising a vapor permeable membrane.

16. The apparatus of claim 1, wherein the desiccant desorbs at least 40% of captured moisture at an exterior relative humidity of 50% and exterior temperature of 22° C. within 20 minutes at a desorption temperature of 95° C.

17. The apparatus of claim 1, wherein the valve assembly comprises an actuator configured to move the valve assembly relative to the housing, the actuator being heat activated such that, when the heater is supplying heat, the actuator moves the valve assembly to the desorption position.

18. An apparatus comprising:
   a) a housing comprising:
      i. a first chamber having a heater,
      ii. at least one adsorption port into the first chamber, and
         iii. a desiccant disposed proximate to the at least one adsorption port; and
   b) a valve assembly located within the housing and being transitionable between an adsorption position and a desorption position, where in the adsorption position the at least one adsorption port is open and when in the desorption position a desorption port is formed between the valve assembly and housing, wherein:
      the at least one adsorption port comprises at least one opening in a wall of the housing, the wall being proximate to and substantially parallel to the desiccant; and
   c) a heat spreader disposed in the first chamber and in contact with the heater and the desiccant.

19. An apparatus comprising:
   a) a housing comprising:
      i. a first chamber having a heater,
      ii. at least one adsorption port into the first chamber, and iii. a desiccant disposed proximate to the at least one adsorption port;
b) a valve assembly located within the housing and being transitionable between an adsorption position and a desorption position, where in the adsorption position the at least one adsorption port is open and when in the desorption position a desorption port is formed between the valve assembly and housing, wherein:
a wall of the housing at least partially surrounds the desiccant and is removed from the desiccant, and
the at least one adsorption port comprises a plurality of openings in the wall of the housing facing the desiccant and
c) a heat spreader disposed in the first chamber and in contact with the heater and the desiccant.

* * * * *